(12) United States Patent
Hofmann (10) Patent No.: US 11,365,794 B2
(45) Date of Patent: Jun. 21, 2022

(54) SPUR GEAR DIFFERENTIAL HAVING BLOCKING FUNCTION

(71) Applicant: Hirschvogel Umformtechnik GmbH, Denklingen (DE)

(72) Inventor: Tobias Hofmann, Stöttwang (DE)

(73) Assignee: Hirschvogel Umformtechnik GmbH, Denklingen (DE)

( * ) Notice: Subject to any disclaimer, the term of this patent is extended or adjusted under 35 U.S.C. 154(b) by 0 days.

(21) Appl. No.: 17/283,291

(22) PCT Filed: Oct. 15, 2019

(86) PCT No.: PCT/EP2019/077896
§ 371 (c)(1),
(2) Date: Apr. 7, 2021

(87) PCT Pub. No.: WO2020/083707
PCT Pub. Date: Apr. 30, 2020

(65) Prior Publication Data
US 2021/0356025 A1 Nov. 18, 2021

(30) Foreign Application Priority Data
Oct. 24, 2018 (DE) ..................... 10 2018 126 551.4

(51) Int. Cl.
*F16H 48/11* (2012.01)
*F16H 48/28* (2012.01)
(Continued)

(52) U.S. Cl.
CPC ............. *F16H 48/11* (2013.01); *F16H 48/28* (2013.01); *F16H 48/40* (2013.01); *F16H 2048/106* (2013.01)

(58) Field of Classification Search
CPC .......... F16H 48/11; F16H 48/28; F16H 48/40; F16H 2048/106; F16H 2048/282; F16H 2048/087
See application file for complete search history.

(56) References Cited

U.S. PATENT DOCUMENTS 2,462,000 A  2/1949 Randall
3,929,036 A  12/1975 Shealy
(Continued)

FOREIGN PATENT DOCUMENTS

DE  102009015442 A1  9/2010
EP  0233583 A1 *  8/1987  ........... F16H 48/285

OTHER PUBLICATIONS

International Search Report issued in connection with the corresponding international application No. PCT/EP2019/077896 dated Jan. 17, 2020.
(Continued)

*Primary Examiner* — Sherry L Estremsky
(74) *Attorney, Agent, or Firm* — The H.T. Than Law Group (57) ABSTRACT

The invention relates to a spur gear differential (1), in particular for motor vehicles, comprising a planet carrier (2) for circulating about a differential axis (X), a first output spur gear (3), which is arranged coaxially to the differential axis (X), a second output spur gear (4), which is likewise arranged coaxially to the differential axis (X), and at least one pair (5) of planet gears (6, 7) that mesh with one another, said pair being rotatably arranged in the planet carrier (2), each planet gear (6, 7) meshing with one output spur gear (3, 4). At least one of the output spur gears (3, 4) and/or of the planet gears (6, 7) is conically toothed in such a way that, when the planet gears (6, 7) rotate relative to one another, the at least one of the output spur gears (3, 4) and/or of the planet gears (6, 7) is moved into a position in which a blocking
(Continued)

effect is brought about. The invention further relates to a corresponding method for producing a spur gear differential (1) of this type.

18 Claims, 5 Drawing Sheets

(51) Int. Cl.
*F16H 48/40* (2012.01)
*F16H 48/10* (2012.01)

(56) References Cited

U.S. PATENT DOCUMENTS 6,290,624 B1 * 9/2001 Kam .................. F16H 48/28
475/251
6,634,979 B1 10/2003 Quaife

OTHER PUBLICATIONS

Machine translation of DE 102009015442 to Biermann et al.

* cited by examiner

SPUR GEAR DIFFERENTIAL HAVING BLOCKING FUNCTION

1. FIELD OF THE INVENTION

The invention relates to a spur gear differential, in particular for motor vehicles, comprising a planet carrier for circulating about a differential axis, a first output spur gear which is arranged coaxially to the differential axis, a second output spur gear which is likewise arranged coaxially to the differential axis, and at least one pair of planet gears that mesh with one another, said pair being rotatably arranged in the planet carrier, wherein each planet gear meshes with one output spur gear. The invention further relates to a method for producing such a spur gear differential.

2. BACKGROUND

Spur gear differentials of the type mentioned in the introduction are known in principle from the prior art. Spur gear differentials represent an alternative to conventional differentials which operate with bevel gear sets. In short, a differential and/or spur gear differential is designed to enable the two wheels which are driven by the differential to rotate at different speeds in order to permit, for example, cornering. Spur gear differentials are disclosed by way of example in DE 10 2012 208 806 A1 and DE 10 2007 040 475 A1.

Locking differentials, which are provided to counteract the effect caused by the differential with a blocking effect, are also known from the prior art. This is advantageous in certain situations, for example in the case where slip occurs on one of the wheels. In this case, with a differential without a blocking effect (open differential) one wheel would spin, whereas the other wheel would barely rotate or not rotate at all. The blocking effect in this case causes more torque to be transmitted to the wheel without slip, i.e. the relative speed between the output spur gears is reduced. In certain applications, the blocking effect may even bring about a rigid coupling between the output spur gears, for example if a utility vehicle temporarily has to drive through difficult terrain or fields.

A drawback with the spur gear differentials known from the prior art is that they are relatively costly to produce. This relates, in particular, to the toothing of the output spur gears and the planet gears. Thus, for the functional use, the aforementioned gearwheels must pass through several post-processing steps (deburring etc.) in order to be able to maintain, in particular, the necessary tight tolerances. Moreover, the spur gear differentials known from the prior art require a relatively large amount of constructional space: this applies in particular when an additional device is to be used for bringing about a blocking effect of the spur gear differential.

Proceeding from this prior art, the object of the present invention is to remedy the above-mentioned drawbacks from the prior art, i.e. in particular to provide a spur gear differential which is able to be produced more easily.

These and other objects, which are also mentioned when reading the following description or which may be identified by the person skilled in the art, are achieved by the subject matter and the method of the independent claims. Advantageous developments form the subject matter of the sub-claims relating thereto.

3. Summary of the Invention

A spur gear differential according to the invention comprises: a planet carrier for circulating about a differential axis, a first output spur gear which is arranged coaxially to the differential axis, a second output spur gear which is likewise arranged coaxially to the differential axis, and at least one pair of planet gears that mesh with one another, said pair being rotatably arranged in the planet carrier, wherein each planet gear meshes with one output spur gear. At least one (or all) of the output spur gears and/or of the planet gears is conically toothed in such a way that, when the planet gears rotate relative to one another, the at least one of the output spur gears and/or of the planet gears is moved into a position in which a blocking effect is brought about.

In this case, due to the oblique and/or tapered shape of the toothing, the conical toothing enables a rotational movement to be converted into a further movement; if two meshing gearwheels rotate relative to one another, therefore, the gearwheels move relative to one another in a further direction, due to the conical toothing of one or both of the gearwheels, for example away from one another or toward one another (they are pressed away from one another by the application of a torque, for example). This additional movement of the at least one of the output spur gears and/or the planet gears is thus advantageously used in order to achieve a blocking effect. Additional devices which increase the blocking effect, therefore, may be optimally dispensed with and/or only need to produce a smaller additional blocking effect. Moreover, the conical toothing is suitable for a more efficient production since the production methods which are suitable for the production of the conical toothing require fewer post-processing steps; optimally the respective toothing may be produced in a single production step.

Preferably the planet gears of the at least one pair of planet gears are conically toothed such that, when the planet gears rotate relative to one another, the planet gears move in the direction of the planet carrier in order to reach a position in which the planet gears press against the planet carrier and thus bring about a blocking effect. Thus a frictional force may be produced by pressing the planet gears against the planet carrier, said frictional force retarding the rotational speed and/or rotational movement of the planet gears relative to one another and thus bringing about a blocking effect, since by the reduced relative rotational speed of the planet gears to one another, the relative speed of the output spur gears to one another is also reduced. A blocking effect may thus be achieved in a particularly effective manner.

The planet gears of the at least one pair of planet gears may be conically toothed such that, when the planet gears rotate relative to one another, the planet gears move in opposing directions in order to reach the position in which the planet gears press against the planet carrier and thus bring about a blocking effect. Thus a blocking effect may be achieved in a simple manner with a simultaneously compact design of the locking differential.

Preferably the output spur gears are conically toothed such that, when the planet gears rotate relative to one another, the output spur gears move relatively toward one another in order to reach a position in which the output spur gears are pressed against one another and thus bring about a blocking effect. By the output spur gears pressing against one another, therefore, a frictional force is produced between the output spur gears, said frictional force causing a torque to be transmitted from the faster output spur gear to the slower output spur gear. As a result, the relative rotational speed of the output spur gears to one another is reduced, whereby a blocking effect is effectively achieved.

Alternatively, it may also be provided that the output spur gears are conically toothed such that, when the planet gears rotate relative to one another, the output spur gears move in the direction of the planet carrier in order to reach a position in which the output spur gears press against the planet carrier and thus bring about a blocking effect. In other words, by pressing the respective output spur gear against the planet carrier the rotational speed of the output spur gears is adapted toward the rotational speed of the planet carrier. Thus the rotational speed of the output spur gears relative to one another is reduced and a blocking effect is effectively achieved.

The planet carrier may have one respective defined friction region for each of the planet gears, the respective planet gear being able to press thereagainst (to bring about the blocking effect). Thus, in particular, the wear which is caused by the compressive force and/or normal force acting between the respective planet gear and the planet carrier may be reduced.

The respective friction region may have a structure, in particular a friction disk, for increasing the friction between the friction region and the planet gear pressing against the friction region. Thus by the increased friction and thus the increased frictional force (adhesive and/or sliding friction force) the blocking effect may be effectively increased. Preferably, the structure (axially) protrudes from the planet carrier. Thus the path which the respective planet gear has to cover in order to press against the planet carrier and/or the structure for effecting the blocking effect may be reduced; thus a blocking effect may be brought about even more rapidly.

The respective friction region may have a recess in the planet carrier, the structure preferably being received therein. Thus the spur gear differential may be of compact design.

The respective planet gear may have a (radial and/or axial) projection for pressing against the planet carrier, preferably against the respective friction region and/or the respective structure. In this manner, the path which the respective planet gear has to cover in order to press against the planet carrier and/or the respective friction region/structure for effecting the blocking effect may be reduced; thus a blocking effect may be brought about even more rapidly.

The first and/or the second output spur gear in each case may have a (further) friction region, the respective other output spur gear being able to press thereagainst (to bring about the blocking effect). Thus, in particular, the wear which is caused by the compressive force and/or normal force acting between the output spur gears may be reduced.

The respective (further) friction region may have a structure, in particular a friction disk, for increasing the friction between the friction region and the output spur gear respectively pressing against the friction region. Thus the blocking action may be increased by the increased friction and thus by the increased frictional force.

For a particularly compact design, the respective (further) friction region may have a recess in the respective output spur gear, the structure preferably being received therein.

It is preferred if the tip diameter of the respective conical toothing reduces (continuously) from a first front face to a second front face of the respective conical toothing and the root diameter of the respective conical toothing remains the same or (continuously) increases or reduces from the first front face to the second front face of the respective conical toothing. In other words, it is preferred if a surface surrounding the tooth tips extends so as to taper conically and/or fall away from the first front face to the second front face, wherein a surface surrounding the tooth roots extends cylindrically from the first front face to the second front face, i.e. parallel to the respective rotational axis or conically tapering and/or falling away or conically widening.

Advantageously, the respective conical toothing has a pitch cone angle which ranges from 3 degrees to 45 degrees. In other examples, the pitch cone angle may also range from 5 degrees to 35 degrees, from 10 degrees to 30 degrees, or from 20 degrees to 25 degrees.

Preferably, the respective conical toothing is formed at least by a draft angle for respectively producing the at least one of the output spur gears and/or the planet gears. In other words: the draft angle which is provided for simple removal of the respective gearwheel from the mold may be provided at the same time in order to form the oblique shape of the conical and/or tapered toothing.

For particularly advantageously production, the planet gears and/or the output spur gears may be produced in a forming method, in particular in a pressure forming method. In a particularly preferred exemplary embodiment, the forming method is forging, in particular drop forging. These production methods are suitable, in particular, if the output spur gears are configured as identical parts and/or the planet gears are configured as identical parts.

The spur gear differential may comprise at least two, three, four, five or six pairs of planet gears which mesh with one another and which are rotatably arranged in the planet carrier. For example, therefore, the blocking effects brought about by the planet gears may accumulate in order to achieve an even greater blocking effect.

According to a further aspect, the invention relates to a method for producing a spur gear differential as described above. The method comprises the following steps: providing a planet carrier for circulating about a differential axis, providing a first output spur gear coaxially to the differential axis, providing a second output spur gear coaxially to the differential axis and providing at least one pair of planet gears that mesh with one another, said pair being rotatably arranged in the planet carrier such that each planet gear meshes with one output spur gear. At least one (or all) of the output spur gears and/or of the planet gears is conically toothed in such a way that, when the planet gears rotate relative to one another, the at least one of the output spur gears and/or of the planet gears is moved into a position in which a blocking effect is brought about. The above-mentioned embodiments and advantages described relative to the spur gear differential also apply equally to the method.

4. DESCRIPTION OF A PREFERRED EMBODIMENT

The invention is described by way of example hereinafter with reference to the figures in which an advantageous exemplary embodiment of the invention is shown. In the figures.

5. Detailed Description of the Invention

Figure 1:
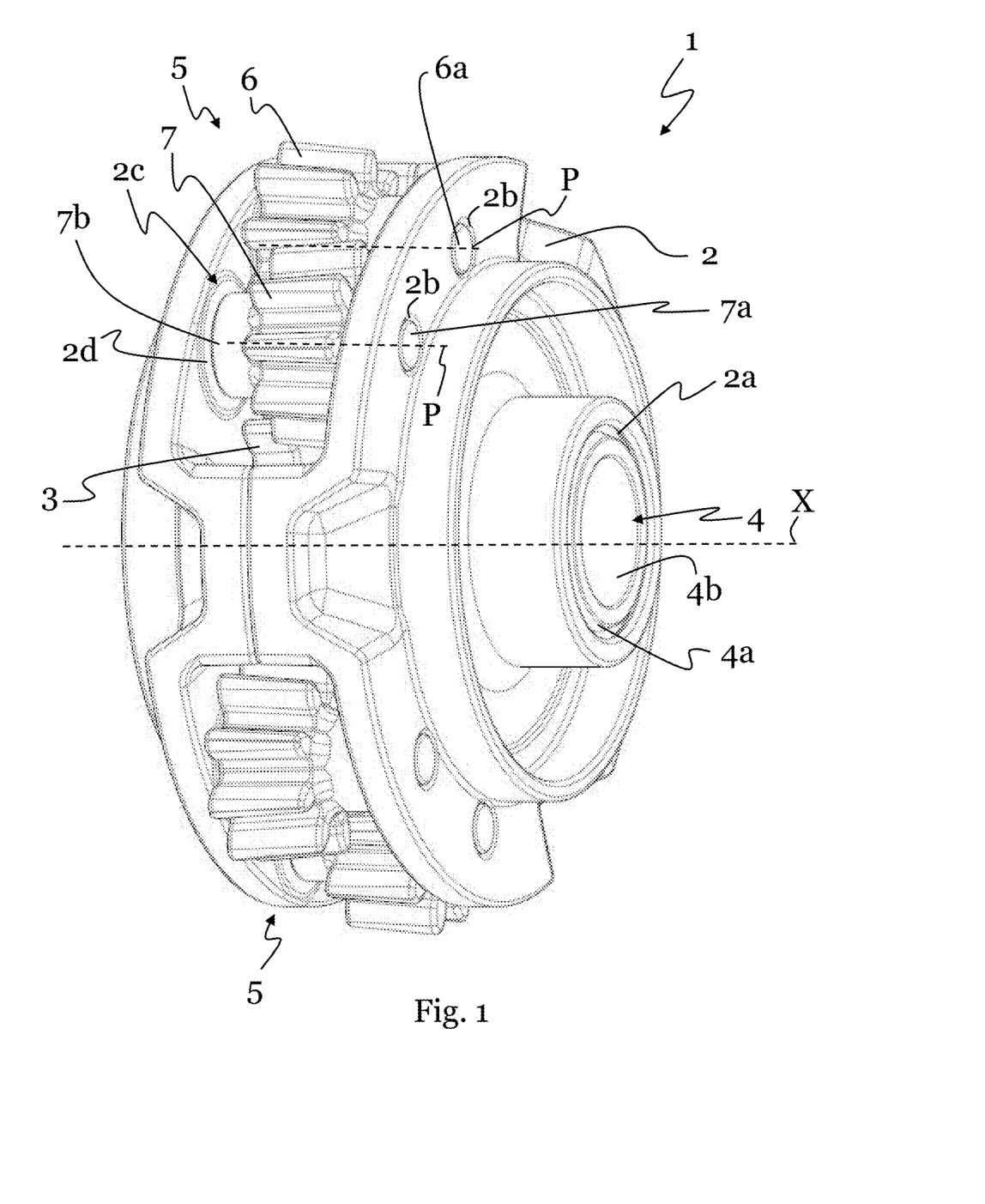
FIG. 1 shows a schematic perspective view of an exemplary embodiment of the spur gear differential according to the invention.
Figure 2:
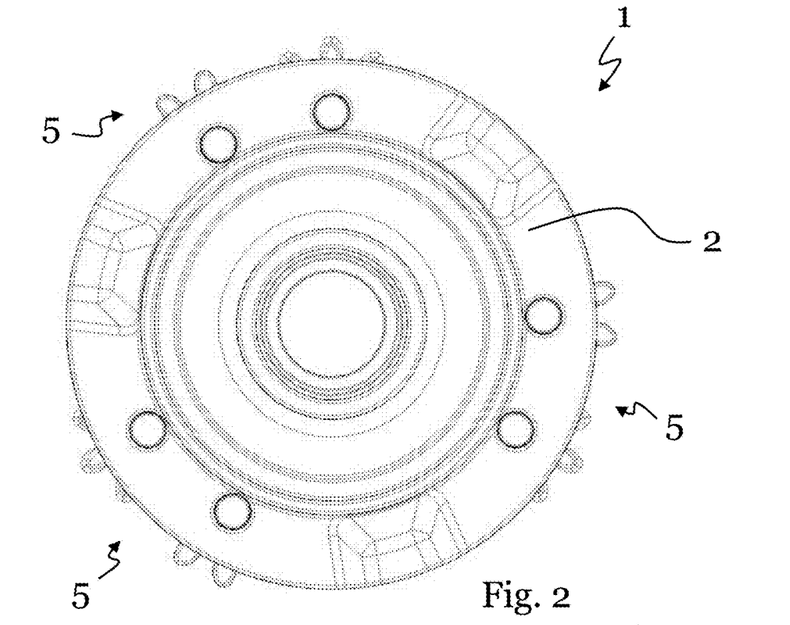
FIG. 2 shows a side view of the spur gear differential shown in FIG. 1.
Figure 3:
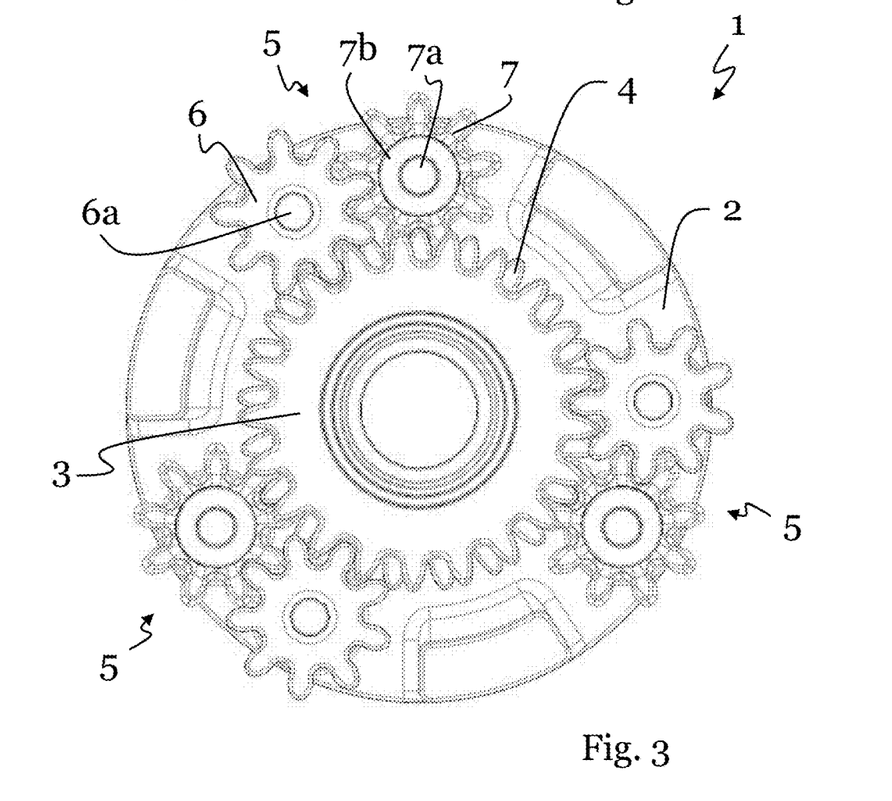
FIG. 3 shows the side view shown in FIG. 2, wherein in particular for illustrating the output spur gears and planet gears, shown by way of example, a part of the planet carrier has been omitted.

FIG. 1 shows by way of example a spur gear differential 1 according to the invention which in the known manner ensures that the different rotational speeds of the output shafts of a motor vehicle are compensated during cornering. The spur gear differential 1 has a planet carrier (and/or differential housing) 2 which is provided for circulating about a differential axis X and which is driven, for example via a gearbox and an articulated shaft, by a machine, for example an internal combustion engine or an electric machine. To this end, for example, it may be provided that a drive element is formed with the planet carrier 2 in order to transmit the power of the machine to the planet carrier 2 (also denoted as "final drive" and/or axle drive or axle transmission). The drive element may be configured releasably or non-releasably with the planet carrier 2, for example via an integral and/or material configuration. For example, the planet carrier 2 is radially extended and the drive element is configured in this radial extension. The drive element is, for example, a spur gear.

The spur gear differential 1 also has a first output spur gear (first sun gear) 3 which is arranged coaxially to the differential axis X and a second output spur gear (second sun gear) 4 which is also arranged coaxially to the differential axis X. Each of the output spur gears 3, 4 has one respective bearing region 3a, 4a for the rotatable mounting of the respective output spur gear 3, 4 in a corresponding bearing region 2a of the planet carrier 2 so that the output spur gears 3, 4 are rotatable about the differential axis X relative to the planet carrier 2. Each of the bearing regions 3a, 4a is preferably configured as a projection. Each of the output spur gears 3, 4 additionally has one respective (further) bearing region 3b, 4b via which the respective output spur gear 3, 4 is connected fixedly in terms of rotation to a respective output shaft, not shown in more detail, so that the respective output shaft is also arranged coaxially to the differential axis X. The respective bearing region 3b, 4b may be configured as a bore, in particular as a through-bore, in the respective output spur gear 3, 4.

The spur gear differential 1 also has at least one pair 5 of planet gears 6, 7 which mesh with one another and which are rotatably arranged in the planet carrier 2, wherein the planet gears 6, 7 mesh with one respective output spur gear 3, 4. In the exemplary embodiment shown in FIGS. 1 to 4 of the spur gear differential 1, the (first) planet gear 6 meshes with the first output spur gear 3, wherein the (second) planet gear 7 meshes with the second output spur gear 4. As may be identified in FIGS. 1 to 4, three pairs 5 of planet gears 6, 7 which mesh with one another may be rotatably arranged in the planet carrier 2. In other exemplary embodiments (only) two, four, five or six pairs 5 of planet gears 6, 7 which mesh with one another may be arranged. The plurality of pairs 5 of planet gears 6, 7 which mesh with one another are preferably arranged so as to be equally distributed about the differential axis X.

Each of the planet gears 6, 7 is rotatably arranged and/or mounted about a respective rotational axis P in the planet carrier 2. The respective rotational axis P is substantially parallel to the differential axis X. Each of the planet gears 6, 7 may have one respective bearing region 6a, 7a for mounting the respective planet gear 6, 7 in a corresponding bearing region 2b formed in the planet carrier 2. The respective bearing region 6a, 7a may have at least one projection which is rotatably arranged and/or mounted in a corresponding recess of the bearing region 2b, in order to be rotatably mounted about the respective bearing axis P. The respective bearing region 6a, 7a may also have two projections which are provided on opposing sides of the respective planet gear 6, 7 and which in each case are rotatably arranged in a corresponding recess of the bearing region 2b.

Figure 5:
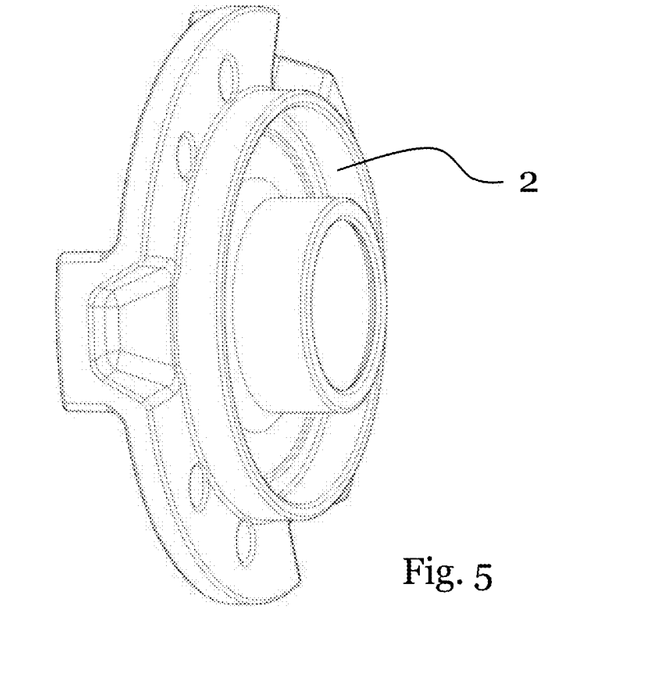
FIG. 5 shows a schematic perspective view of a part of the planet carrier, shown by way of example in FIGS. 1 to 4.

As may be identified in FIG. 1, the planet carrier 2 may be of multi-part, in particular two-part, configuration, in order to permit for example a simple mounting of the output spur gears 3, 4 and the planet gears 6, 7. In particular, the two parts of the planet carrier 2 may be configured substantially identically. A part of a multi-part, in particular two-part, planet carrier 2 is shown by way of example in FIG. 5.

Figure 6:
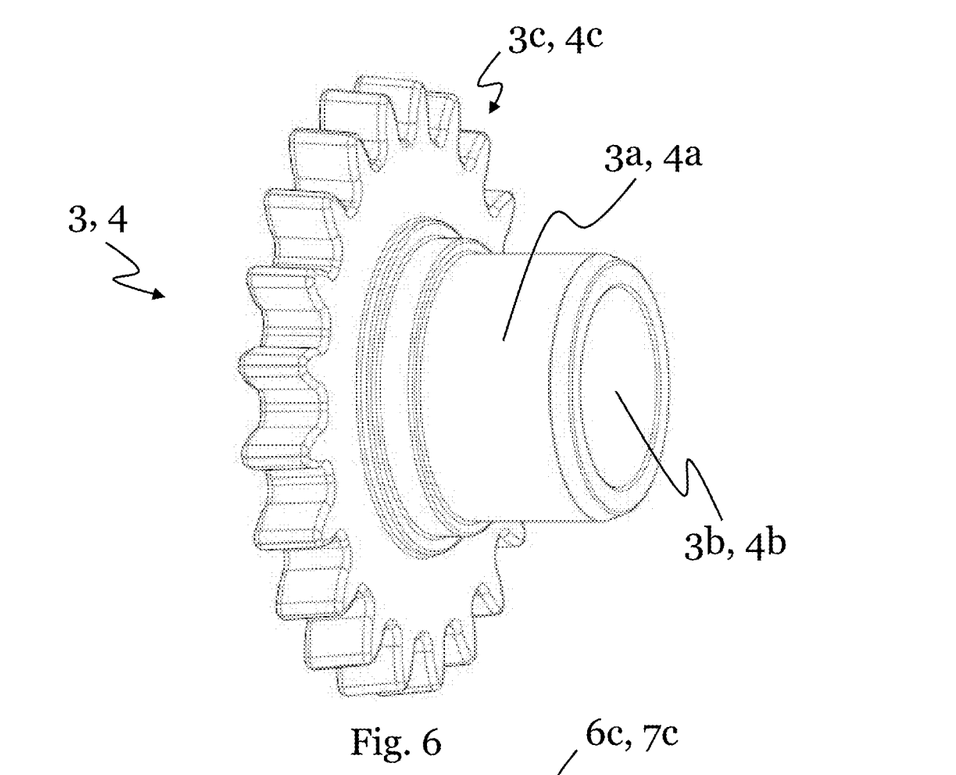
FIG. 6 shows a schematic perspective view of one of the output spur gears, shown by way of example in FIGS. 1 to 4.

According to the invention, it is thus provided that at least one of the output spur gears 3, 4 and/or planet gears 6, 7 is conically toothed such that when the planet gears 6, 7 rotate relative to one another—i.e. when different rotational speeds are produced on the output shafts by the spur gear differential 1—the at least one of the output spur gears 3, 4 and/or planet gears 6, 7 is moved into a position in which a blocking effect is brought about. In the exemplary embodiment shown in the figures, both the output spur gears 3, 4 and the planet gears 6, 7 are conically toothed, i.e. have a conical toothing 3c, 4c, 6c, 7c. This may be clearly identified, in particular, in FIGS. 4, 6 and 7.

According to the exemplary embodiment shown in the figures, a blocking effect is brought about as follows. If the planet gears 6, 7 rotate relative to one another, the conical toothing 6c, 7c causes the planet gears 6, 7 to move in the direction of the planet carrier 2, in particular in opposing directions. The planet gears 6, 7 are thus moved in each case axially along their respective rotational axis P; i.e. the respective bearing region 6a, 7a also causes the respective planet gear 6, 7 to be axially displaceably arranged and/or mounted in the planet carrier 2 (with a certain degree of play). When viewing FIGS. 1 and 4, therefore, the planet gear 6 is moved to the right and the planet gear 7 is moved to the left. Due to this movement, in each case the planet gears 6, 7 finally reach a position in which the planet gears 6, 7 press against the planet carrier 2 and thus bring about a blocking effect. In other words, a (frictional) force is produced by pressing the planet gears 6, 7 against the planet carrier 2, said force retarding the rotational speed of the planet gears 6,7 relative to one another, thereby reducing at the same time the rotational speed of the output spur gears 3, 4 relative to one another and thus the rotational speed of the output shafts relative to one another, said output shafts being connected fixedly in terms of rotation to said output spur gears.

In order to intensify even further the aforementioned effect, the planet carrier 2—as may be identified in particular in FIG. 1—may have one respective defined friction region 2c for each of the planet gears 6, 7, the respective planet gear 6, 7 being able to press thereagainst. The friction region 2c is preferably designed such that the wear which occurs on the contact surface between the planet carrier 2 and respective planet gear 6, 7 is reduced. To this end, means may be used, for example, as are known from friction clutches.

As shown by way of example in FIG. 1, the respective friction region 2c may have a friction disk 2d for increasing the friction between the between the friction region 2c and the planet gear 6, 7 pressing against the friction region 2c. The friction disk 2d is preferably provided in the friction region 2c such that it protrudes from the planet carrier 2 (axially, i.e. in the direction of the differential axis X), in particular protrudes by a defined amount, for example by 0.5 mm. Instead of the friction disk 2d, however, the friction region 2c may also have any other structure for increasing the friction between the friction region 2c and the planet gear 6,7 pressing against the friction region 2c, said structure preferably protruding from the planet carrier 2 as described above. The friction region 2c preferably has a recess which is configured in the planet carrier 2, the structure and/or friction disk 2d being received therein, for example. The recess preferably has a depth such that the structure received in the recess is able to protrude slightly from the planet carrier 2, as described above. Preferably the depth is 1 mm so that a structure and/or friction disk, which is preferably 1.5 mm thick, protrudes 0.5 mm from the planet carrier 2.

Figure 4:
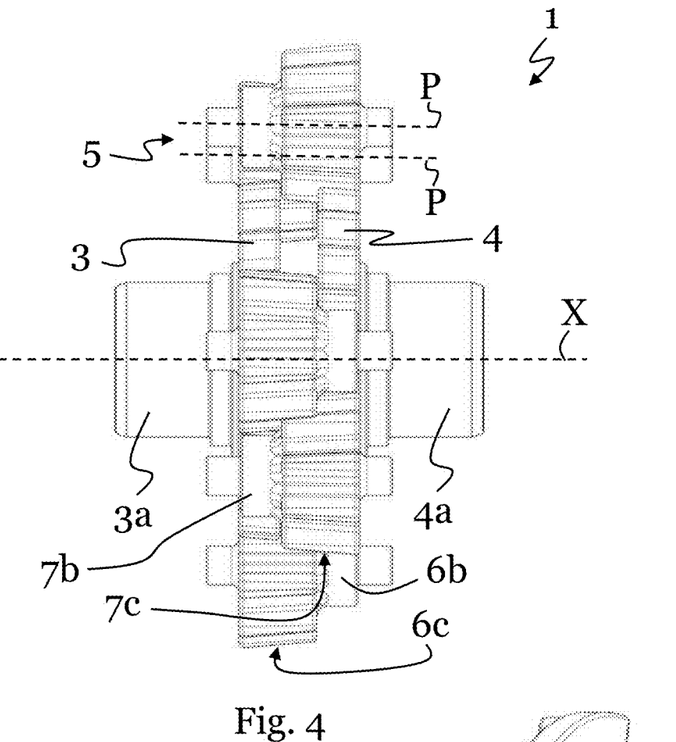
FIG. 4 shows a plan view of the spur gear differential shown in FIGS. 1 to 3, wherein for illustrating the output spur gears and planet gears, shown by way of example, the planet carrier has been omitted.
Figure 7:
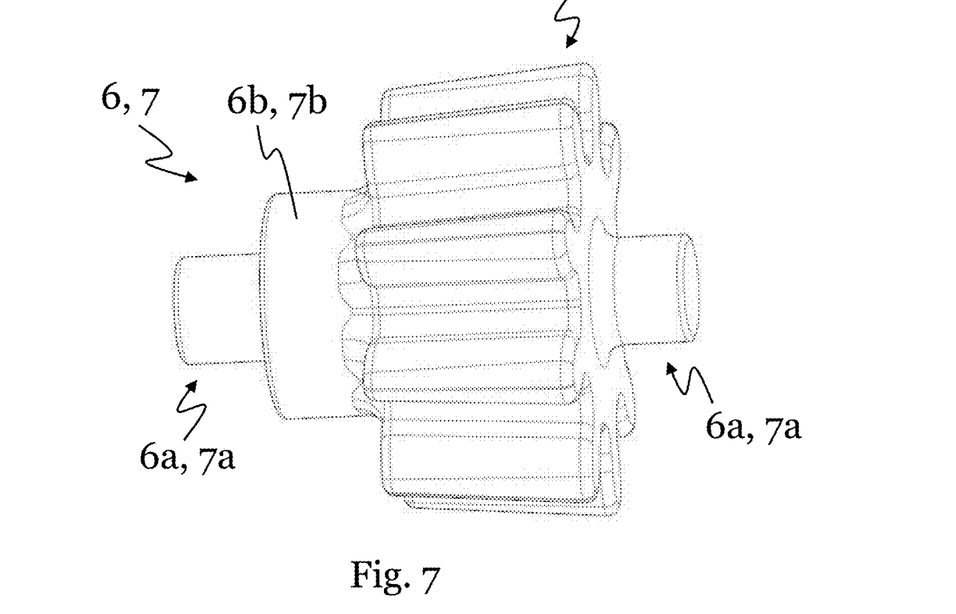
FIG. 7 shows a schematic perspective view of one of the planet gears, shown in FIGS. 1 to 4.

As may be identified, in particular, in FIGS. 1, 4 and 7, the respective planet gear 6, 7 may have a (radial and/or axial) projection 6b, 7b for pressing against the planet carrier 2 and/or the respective friction region 2c. As may be identified, in particular, in FIG. 7, the projection 6b, 7b is preferably configured integrally and/or coaxially to the rotational axis P with the respective bearing region 6a, 7a, in particular with a projection of the respective bearing region 6a, 7a. A surface of the respective projection 6b, 7b which presses against the planet carrier 2 and/or the respective friction region 2c may have a structure for increasing the friction between the planet carrier 2 and/or friction region 2c and the planet gear 6b, 7b pressing against the planet carrier 2 and/or friction region 2c.

Since the output spur gears 3, 4 of the spur gear differential 1, shown by way of example in the figures, are also conically toothed, due to their conical toothing 3c, 4c and the planet gears 6, 7 rotating relative to one another, the output spur gears are (also) moved into a position in which a blocking effect is brought about. The output spur gears 3, 4 are thus preferably axially displaceably mounted (along the differential axis X) relative to the planet carrier 2. More specifically, the output spur gears 3, 4 shown in FIGS. 1 to 4 are moved relatively toward one another in order to reach finally a position in which the output spur gears 3, 4 press against one another and thus bring about a blocking effect. A force is thus produced by the output spur gears pressing against one another and, due to the increased frictional force between the output spur gears 3, 4, this force reduces the relative rotational speed of the output spur gears 3, 4 to one another and as a result the relative rotational speed of the output shafts to one another, said output shafts being connected fixedly in terms of rotation to said output spur gears; a torque is thus (directly) transmitted from the faster output spur gear to the slower output spur gear.

In order to increase the aforementioned effect of the blocking effect by the output spur gears 3, 4, the first and/or the second output spur gear 3, 4 in each case may have a (further) friction region, the respective other output spur gear 3, 4 being able to press thereagainst. The friction region is preferably provided on a surface of the respective output spur gear 3, 4 which opposes the respective other output spur gear 3, 4. The (further) friction region may be configured, in particular, so as to correspond to the above-described friction region 2c. Thus the (further) friction region may have, for example, a structure, in particular a friction disk, for increasing the friction between the friction region and the respective output spur gear 3, 4 pressing against the friction region. For example, such a friction region has a recess which is configured in the respective output spur gear 3, 4, the structure, i.e. for example a friction disk, preferably being received therein.

As an alternative to the above-described conical toothing of the output spur gears 3, 4 in which the output spur gears 3, 4 move relatively toward one another due to the planet gears 6, 7 rotating relative to one another, the output spur gears 3, 4 may also be conically toothed such that, due to the relative rotation of the planet gears 6, 7 to one another, they move in the direction of the planet carrier 2 in order to reach a position in which the output spur gears 3, 4 press against the planet carrier 2 and thus bring about a blocking effect. In other words: the direction of movement of the output spur gears 3, 4, which are used in the preferred exemplary embodiment and which move toward one another, may be reversed by a corresponding design of the conical toothing 3c, 4c and thus a modified engagement between the output spur gears 3, 4 and the respective planet gear 6, 7. The same applies to the planet gears 6, 7.

The invention is not limited to the preferred bringing about of a blocking effect, both by the output spur gears 3, 4 and by the planet gears 6, 7, as described above. For example, a blocking effect may also be brought about only by the above-described embodiment of the output spur gears 3, 4. Alternatively, a blocking effect may also be brought about only by the above-described embodiment of the planet gears 6, 7. It is also not necessary for both output spur gears 3, 4 and/or both planet gears 6, 7 to be conically toothed. For example, it may also be provided that only one of the output spur gears 3, 4 and/or only one of the planet gears 6, 7 is conically toothed in order to bring about a blocking effect according to the invention, by moving the output spur gears 3, 4 and/or the planet gears 6, 7.

The respective gearwheel which is conically toothed, i.e. for example one or both of the output spur gears 3, 4 and/or one or both of the planet gears 6, 7 (see in particular FIGS. 6 and 7), is used in the spur gear differential 1 as a corresponding spur gear with the difference that it has the gearwheel geometry of a bevel gear. It may be clearly identified in FIG. 8, by way of example with reference to a planet gear 6, 7, that the tip diameter of the respective conical toothing 6c, 7c (continuously) decreases from a first front face of the respective conical toothing 6c, 7c to a second front face of the conical toothing 6c, 7c which is provided by way of example on the part of the projection 6b, 7b, and wherein the root diameter of the respective conical toothing 6c, 7c also decreases from the first front face to the second front face of the respective conical toothing. Alternatively, however, it may also be provided that the root diameter of the respective conical toothing 6c, 7c remains the same or increases from the first front face to the second front face of the respective conical toothing 6c, 7c. In other words: the respective gearwheel has—as in the case of a spur gear—a substantially cylindrical rolling surface, wherein the profile of the toothing changes (continuously and monotonously) from a front face of the toothing to the other front face of the toothing according to a taper and/or cone. Thus the respective gearwheel with the conical toothing also has a pitch cone angle. As may be identified, for example, in FIG. 4, the tapered shape of the conical toothing—i.e. the design for forming the conical toothing and/or tapered shape of the respective gearwheel—preferably tapers in a direction which corresponds to the direction of movement of the respective gearwheel in order to reach the position for bringing about the blocking effect.

Figure 8:
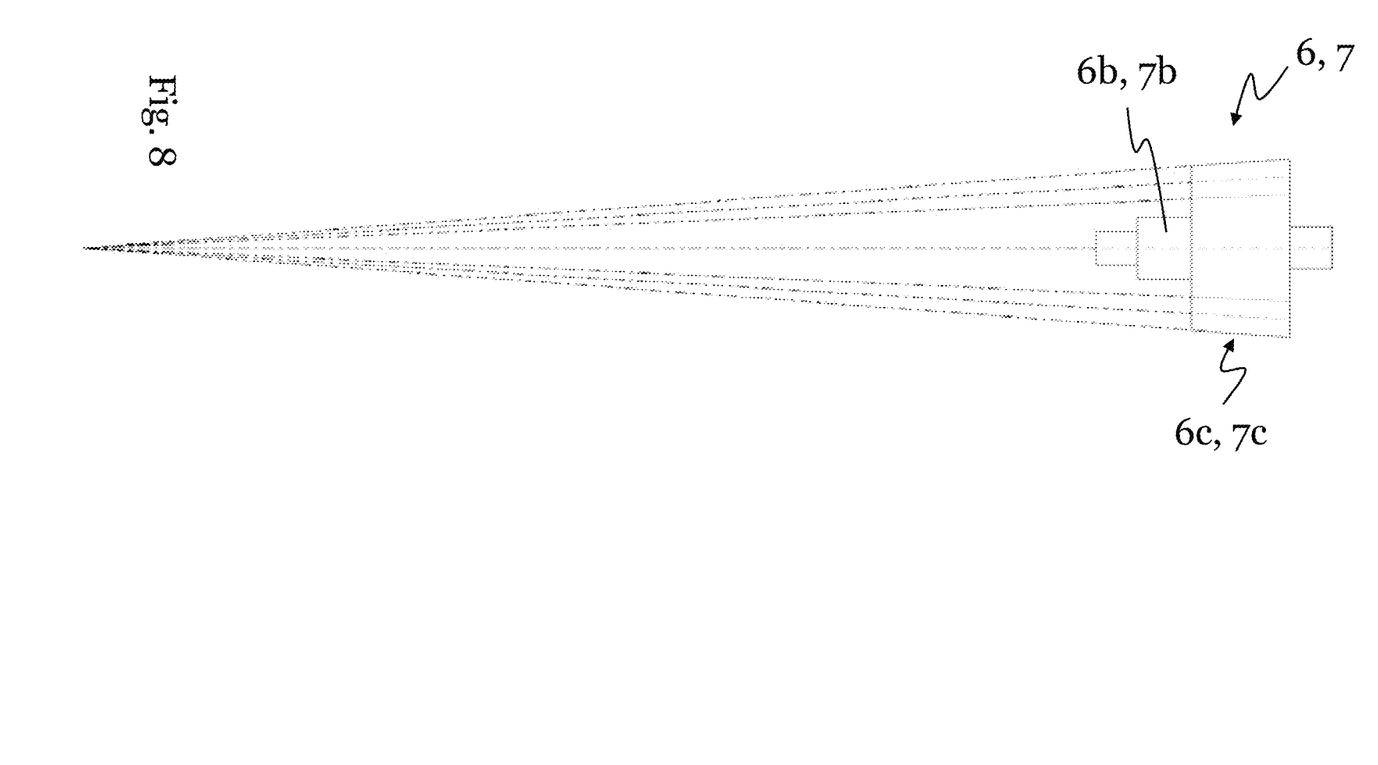
FIG. 8 shows a side view of the planet gear, shown in FIG. 7, with the tip cone angle, pitch cone angle and root cone angle shown.

As may be clearly identified in FIG. 8, it is preferred if the half-lines from the tip cone angle, pitch cone angle and root cone angle of the respective conical toothing intersect at a point of intersection, for example on the rotational axis P. Preferably the tip cone angle, pitch cone angle and root cone angle are all (slightly) different but always run in the same direction. The pitch cone angle may, for example, range from 3° to 45°. In other examples, the pitch cone angle may range from 5° to 35°, from 10° to 30° or from 20° to 25°. The tip cone angle is particularly preferably 3° or 5°. The root cone angle is particularly preferably 5° or 3°. Preferably the conical toothing (viewed in plan view of the respective tooth) is straight-toothed or obliquely-toothed, i.e. in particular configured parallel or obliquely to the respective rotational axis P (viewed in plan view of the respective tooth). The type of toothing is, for example, an involute toothing (see for example FIG. 3).

A particular advantage of the conical toothing of the respective gearwheel is, in particular, that such a gearwheel may be produced more easily. Thus the gearwheel to be produced may be removed more easily from a corresponding mold for producing the respective gearwheel, due to the conical toothing produced and/or shaped in the production process, i.e. in particular the oblique toothing provided by the tapered shape; this is advantageous, in particular, when the respective gearwheel is not obliquely toothed. Thus the respective conical toothing may be formed at least by a draft angle for producing the respective gearwheel. The draft angle is thus advantageous, in particular, for the reason that the component—in this case the gearwheel—would otherwise remain stuck in the respective mold for producing the component. In particular a forming method, such as for example a pressure forming method, is suitable for producing the planet gears 6, 7 and/or the output spur gears 3, 4—in particular for those gearwheels which are conically toothed. It is particularly preferred if the forming method is forging, in particular drop forging. Steel is used as the preferred material for producing the respective gearwheel. The respective gearwheel and/or the material thereof, i.e. in particular the steel, may be tempered and/or hardened.

The invention is not limited to the exemplary embodiment shown. All of the features described above or shown in the figures, i.e. in particular the features of the output spur gears 3, 4 and the planet gears 6, 7, are advantageously able to be combined together in any manner within the scope of the invention.

The invention claimed is:

1. A differential (1) comprising:
   a planet carrier (2) for circulating about a differential axis (X),
   a first output sun gear (3) which is arranged coaxially to the differential axis (X),
   a second output sun gear (4) which is likewise arranged coaxially to the differential axis (X),
   at least one pair (5) of planet gears (6, 7) that mesh with one another, said pair being rotatably arranged in the planet carrier (2), wherein each planet gear (6, 7) meshes with one output sun gear (3, 4),
   wherein at least one of the output sun gears (3, 4) and/or of the planet gears (6, 7) is conically toothed in such a way that, when the planet gears (6, 7) rotate relative to one another, the at least one of the output sun gears spur gears (3, 4) and/or of the planet gears (6, 7) is moved into a position in which a blocking effect is brought about,
   wherein the planet gears (6, 7) of the at least one pair (5) of planet gears (6, 7) are conically toothed such that, when the planet gears (6, 7) rotate relative to one another, the planet gears (6, 7) move in the direction of the planet carrier (2) in order to reach a position in which the planet gears (6, 7) press against the planet carrier (2) and thus bring about a blocking effect.

2. The differential (1) as claimed in claim 1, wherein the planet gears of the at least one pair (5) of planet gears (6, 7) are conically toothed such that, when the planet gears (6, 7) rotate relative to one another, the planet gears (6, 7) move in opposing directions in order to reach the position in which the planet gears (6, 7) press against the planet carrier (2) and thus bring about a blocking effect.

3. The differential (1) as claimed in claim 1, wherein the output sun gears (3, 4) are conically toothed such that, when the planet gears (6, 7) rotate relative to one another, the output sun gears (3, 4) move relatively toward one another in order to reach a position in which the output sun gears (3, 4) are pressed against one another and thus bring about a blocking effect.

4. The differential (1) as claimed in claim 1, wherein the output sun gears (3, 4) are conically toothed such that, when the planet gears (6, 7) rotate relative to one another, the output sun gears (3, 4) move in the direction of the planet carrier (2) in order to reach a position in which the output sun gears (3, 4) press against the planet carrier (2) and thus bring about a blocking effect.

5. The differential (1) as claimed in claim 1, wherein the planet carrier (2) has one respective defined friction region (2c) for each of the planet gears (6, 7), the respective planet gear (6, 7) being able to press thereagainst.

6. The differential (1) as claimed in claim 5, wherein the respective friction region (2c) has a structure for increasing the friction between the friction region (2c) and the planet gear (6, 7) pressing against the friction region (2c).

7. The differential (1) as claimed in claim 5, wherein the respective friction region (2c) has a recess in the planet carrier (2).

8. The differential (1) as claimed in claim 1, wherein the respective planet gear (6, 7) has a projection (6b, 7b) for pressing against the planet carrier (2).

9. The differential (1) as claimed in claim 1, wherein the first and/or the second output sun gear (3, 4) in each case has a friction region, the respective other output sun gear (3, 4) being able to press thereagainst.

10. The differential (1) as claimed in claim 9, wherein the respective friction region has a structure for increasing the friction between the friction region and the output sun gear (3, 4) respectively pressing against the friction region.

11. The differential (1) as claimed in claim 9, wherein the respective friction region has a recess in the respective output sun gear (3, 4).

12. The differential (1) as claimed in claim 1, wherein the tip diameter of the respective conical toothing (3c, 4c, 6c, 7c) reduces from a first front face to a second front face of the respective conical toothing (3c, 4c, 6c, 7c) and wherein the root diameter of the respective conical toothing (3c, 4c, 6c, 7c) remains the same or increases or reduces from the first front face to the second front face of the respective conical toothing (3c, 4c, 6c, 7c).

13. The differential (1) as claimed in claim 12, wherein the respective conical toothing (3c, 4c, 6c, 7c) has a pitch cone angle which ranges from 3 degrees to 45 degrees.

14. The differential (1) as claimed in claim 12, wherein the respective conical toothing (3c, 4c, 6c, 7c) is formed at least by a draft angle for respectively producing the at least one of the output sun gears (3, 4) and/or the planet gears (6, 7).

15. The differential (1) as claimed in claim 1, wherein the planet gears (6, 7) and/or the output sun gears (3, 4) are produced in a forming method.

16. The differential (1) as claimed in claim 15, wherein the forming method is forging.

17. The differential (1) as claimed in claim 1, comprising at least two pairs (5) of planet gears (6, 7) which mesh with one another and which are rotatably arranged in the planet carrier (2).

18. A method for producing a differential (1) as claimed in claim 1, comprising the following steps:
- providing a planet carrier (2) for circulating about a differential axis (X),
- providing a first output sun gear (3) coaxially to the differential axis (X),
- providing a second output sun gear (4) coaxially to the differential axis (X),
- providing at least one pair (5) of planet gears (6, 7) that mesh with one another, said pair being rotatably arranged in the planet carrier (2) such that each planet gear (6, 7) meshes with one output sun gear (3, 4),
- wherein at least one of the output sun gears (3, 4) and/or of the planet gears (6, 7) is conically toothed in such a way that, when the planet gears (6, 7) rotate relative to one another, the at least one of the output sun gears (3, 4) and/or of the planet gears (6, 7) is moved into a position in which a blocking effect is brought about.

* * * * *